J. A. BOYAJEAN.
VEHICLE WHEEL TIRE.
APPLICATION FILED AUG. 18, 1908.
942,364.
Patented Dec. 7, 1909.
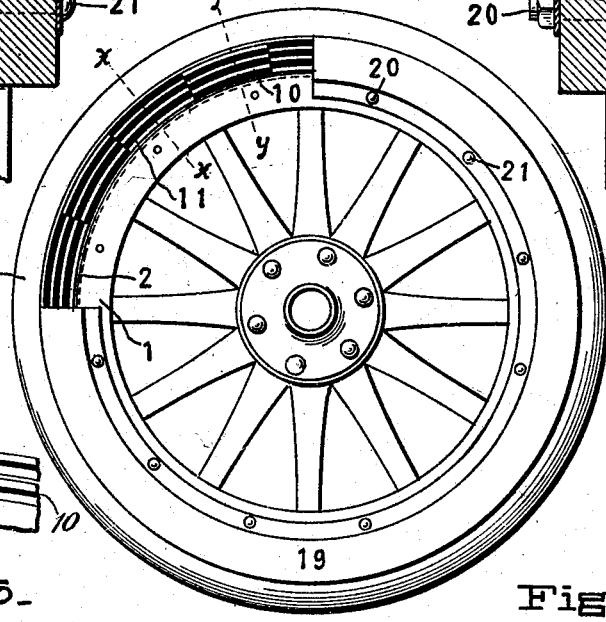
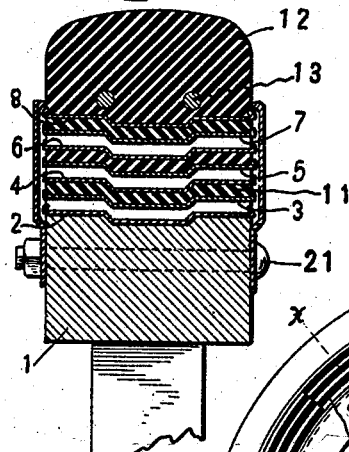
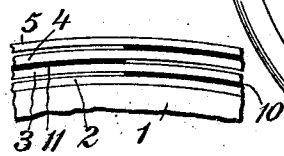
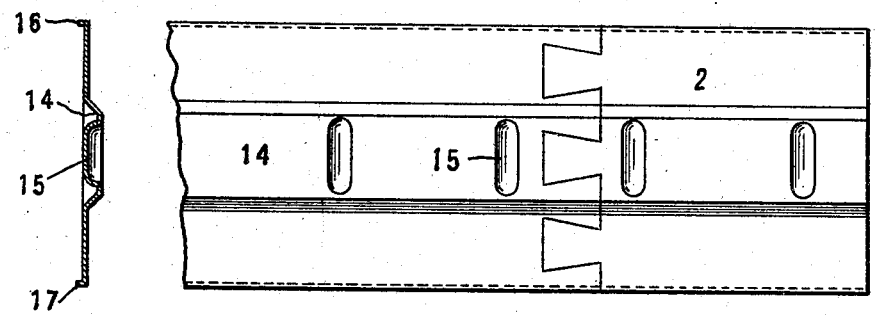
WITNESSES:
J. Clyde Ripley.
E. Bradford.
INVENTOR
John A. Boyajean.
ATTORNEY

UNITED STATES PATENT OFFICE.

JOHN A. BOYAJEAN, OF NEW YORK, N. Y.

VEHICLE-WHEEL TIRE.

942,364.

Specification of Letters Patent.    Patented Dec. 7, 1909.

Application filed August 18, 1908. Serial No. 449,145.

*To all whom it may concern:*

Be it known that I, JOHN A. BOYAJEAN, a citizen of the United States, residing at 118 West One Hundred and Eighteenth street, New York, in the county of New York and State of New York, have invented certain new and useful Improvements in Vehicle-Wheel Tires, of which the following is a specification.

My invention relates to improvements in resilient tires and particularly composite metal and rubber structures.

Spring tires have been heretofore made but they are generally expensive and too unyielding if strong enough to withstand rough usage.

It is my object to produce a light construction having a high degree of resiliency and yet strong and durable and relatively inexpensive.

Broadly considered it consists of a plurality of spring rims spaced apart by layers of rubber pads or similar substance and surmounted by a solid rubber tread, the pads of the different layers being relatively staggered so that each rim is in effect supported only at the ends of the pads of the next inner layer of pads.

In the accompanying single sheet of drawings, Figure 1, is a side elevation of a wheel with a tire of my invention part being broken away to show diagrammatically the relative positions of the pads. Fig. 2, is a radial section of the tire on the line X—X. Fig. 3, is a similar sectional view on the line Y—Y. Fig. 4, is a detail view of a fragment of one of the spring rims. Fig. 5, is a sectional view of the same. Fig. 6, is a section of a pad and fragment of its supporting rim. Fig. 7 is a side view of a fragment of the tire.

The felly 1, of the wheel is of any suitable construction and carries the first rim 2. The other rims such as 3, 4, 5, 6, 7 and 8 are supported by layers of yielding pads for instance of rubber such as 10 and 11. The pads of each layer are spaced apart from each other circumferentially as shown in Fig. 1 and the pads of alternate layers are arranged opposite the spaces of the adjacent layers so that a very resilient effect is produced. The tread 12 is preferably of rubber and may be reinforced by wires or rods such as 13.

The pads are held in place by the special construction of the rims. Each rim has a central channel 14 to receive a corresponding portion of the pads and a series of bosses such as 15 to project into the pads. Both edges of each rim are bent up to form locking flanges such as 16 and 17. The channel, bosses and flanges prevent side movement of the pads while the bosses prevent circumferential movement. The tread is held in place in a manner similar to the pads. I prefer also to use side plates such as 18 and 19 to prevent the entrance of foreign matter between the rims and also to laterally reinforce the rims. The plates are secured in place by bolts such as 20 and 21 so that the plates may be removed at any time.

By this construction a greater resiliency is provided than with continuous rubber layers and the pressure is so distributed by reason of the staggered arrangement of the pads that the tire is nevertheless stiff enough to withstand rough usage.

What I claim is:

1. A vehicle wheel tire comprising a plurality of spring rims of the width of the tire and layers of yielding pads between adjacent rims and seated therein, the pads in each layer being spaced apart and the pads of one layer being opposite and equal in length to the spaces of the adjacent layer.

2. A vehicle wheel tire comprising a plurality of spring rims and layers of yielding pads between adjacent rims, the pads in each layer being spaced apart and the pads of one layer being opposite the spaces of the adjacent layer each rim having a channel and bosses for holding its pads in place.

3. A vehicle wheel tire comprising a plurality of spring rims, and layers of yielding pads spaced apart between the rims, each rim having a projecting channeled portion and side flanges locking the pads in place.

4. A vehicle wheel tire comprising a plurality of spring rims and layers of yielding pads spaced apart between the rims, each rim having a channel, projecting bosses and side flanges locking the pads in place.

5. A vehicle wheel tire comprising a plurality of spring rims and layers of yielding pads spaced apart between the rims, each rim having a channel, projecting bosses and side flanges locking the pads in place and a yielding tread surrounding the outer rim.

JOHN A. BOYAJEAN.

Witnesses:
E. BRADFORD,
ROBT. S. ALLYN.